June 4, 1968 G. A. HELLWARTH ET AL 3,387,222
ADAPTIVE THRESHOLD SIGNAL DETECTOR WITH NOISE SUPPRESSION
Filed July 1, 1965
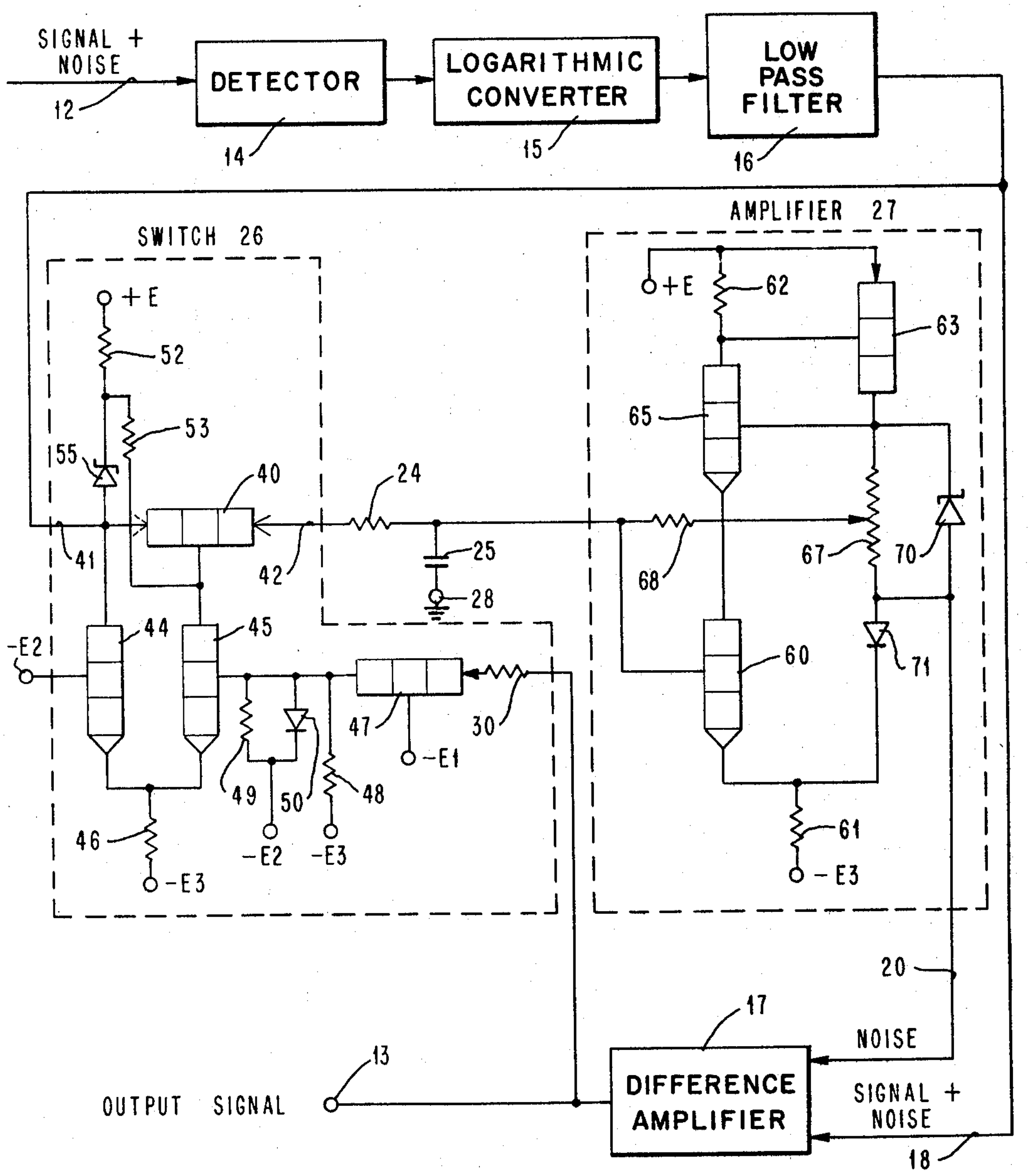
INVENTORS
GEORGE A. HELLWARTH
ALEXANDER W. BIDWELL
DAVID H. BEETLE, JR.
BY W. Robertson
ATTORNEY United States Patent Office 3,387,222
Patented June 4, 1968

3,387,222
ADAPTIVE THRESHOLD SIGNAL DETECTOR WITH NOISE SUPPRESSION

George A. Hellwarth, Poughkeepsie, Alexander W. Bidwell, Wappingers Falls, and David H. Beetle, Jr., Fishkill, N.Y., assignors to International Business Machines Corporation, Armonk, N.Y., a corporation of New York
Filed July 1, 1965, Ser. No. 468,853
19 Claims. (Cl. 329—192)

This invention relates generally to electrical circuits, more specifically to a circuit for detecting a signal in the presence of noise. The invention also relates to an amplifier and a switch that are particularly adapted for such a circuit.

Signals are often generated, transmitted, and operated on in the presence of extraneous signals called noise. In many applications it is particularly important to detect or otherwise operate on a signal that has already been mixed with noise which may obscure the signal. The circuit that will be described later has features that are particularly intended for receiving a speech signal and producing a binary output indicating whether the speech signal is present or absent. This output is useful in other circuits that independently operate on the speech signal. An introductory summary of the invention will help in understanding the goals for such a circuit, some of the problems in meeting these goals, and corresponding features and objects of the invention.

In the circuit of this invention the input signal and accompanying noise are conventionally detected to form a signal that varies in amplitude but not in polarity as a function of time. The signal component and the noise component in this output differ from their corresponding components in the input and they will be called the signal amplitude component and the noise amplitude component. This signal, containing both the noise amplitude and the signal amplitude, is applied to one input of a difference forming circuit. At the other input of the difference forming circuit a signal is applied that represents an average value of the noise amplitude. The difference between these two signals is the signal amplitude plus the variations in the noise amplitude with respect to the average noise amplitude. This residual component of the noise amplitude will be called the A.C. component. A threshold circuit is associated with the difference forming circuit to suppress low amplitude signals associated with the A.C. noise amplitude component and to transmit higher levels associated with the signal amplitudes. The circuit acts to indicate the presence of a signal whose amplitude exceeds by an amount determined by an adjustable threshold the average amplitude of the noise independently of the noise as the noise changes slowly over time. In the application for indicating the presence of a signal, the difference circuit is also associated with a circut called a quantizer that produces a binary output.

In the specific circuit that will be described, the average noise amplitude signal is developed across a capacitor. A switch connects the capacitor to receive the detector output and the switch is operated according to the binary output of the difference circuit to charge the capacitor to the average noise amplitude level in the absence of a signal and to isolate the capacitor from the detector when a signal appears. Thus the capacitor receives the amplitude signals for an interval and is then isolated to hold this level for a following interval. An amplifier is provided at the output terminal of the capacitor to translate the capacitor voltage to the difference circuit. The amplifier is given a high input impedance to prevent it from significantly discharging the capacitor and is given unity gain.

A general object of this invention is to provide a new and improved circuit for detecting a signal in the presence of noise when the noise level is varying or is unknown. A more specific aspect of this object is to provide a new and improved circuit for generating an average noise amplitude signal that can be compared with the amplitude of the signal plus noise.

Another object of this invention is to provide a new and improved transistor switch. For this application and for many other applications it is desirable to have a conductive connection between two switch terminals (in contrast to inductive or capacitive coupling). This goal presents a problem of separating the biasing voltages of the transistors from the signal voltages. This feature is particularly significant in the application that will be described in detail because the general function of the circuit is to distinguish a desired signal from extraneous signals. Thus an object of the invention is to provide a new and improved D.C. coupled switch in which the switch terminals are substantially isolated from the switch operating voltages and currents.

Another object of this invention is to provide a new and improved amplifier having a high input impedance.

Other applications for the circuit will be suggested in the description of a specific embodiment of the invention and from this description other objects, advantages and features of the invention will be apparent.

The single figure in the drawing shows the switch and the amplifier of this invention schematically and shows in block diagram form other components that cooperate with the switch and the amplifier to form the adaptive threshold signal detector.

*The invention; introduction.*—The circuit of this invention receives a signal in the presence of noise at its input terminal 12. It operates on the signal and noise and produces at its output 13 a binary valued signal that indicates whether a signal is present at the input. The circuit includes the following component groups:

(a) An amplitude detector 14 that is connected to receive the signal at input terminal 12, (b) A logarithmic converter 15 and a low pass filter 16 that cooperate to suitably shape the output of detector 14, (c) A differential amplifier 17 having one input terminal 18 connected to receive the output of low pass filter 16.

(d) A circuit that receives the signal plus noise amplitude output of low pass filter 16 and produces an average noise amplitude signal at the other input 20 of differential amplifier 17.

This component group comprises a resistor 24 and a capacitor 25 connected as an averaging circuit, a bilateral switch 26 that connects the capacitor to receive the output of low pass filter 16, and an amplifier 27 that couples the capacitor voltage to differential amplifier input terminal 20; one terminal of capacitor 25 is connected to a point of suitable reference potential 28 such as ground.

A description of a hypothetical operation of the circuit as it has been described so far will be helpful in understanding the features of the circuit that will be described later. Suppose the switch 26 is kept closed continuously so that capacitor 25 charges to the signal plus noise average amplitude. If the signal at input 12 includes rather long intervals of no signal, the voltage across capacitor 25 is a fair indication of the average noise level at input 12. However, when a signal appears, the capacitor would begin averaging the larger value of the signal and the capacitor voltage would thus depart from the amplitude of the average noise. In any event, as the level at input 12 changes from the average in response to a signal, there would be a corresponding change at differential amplifier input 18 with respect to input 20. In the circuit of the drawing, switch 26 and amplifier 27 cooperate to improve the hypothetical operation just described.

Switch 26 has a control input 30 that operates to open and close the switch. Switch control input 30 is connected to a suitable point in the circuit to receive a control voltage to close the switch in the absence of a signal and to open the switch in the presence of a signal. Preferably input 30 is connected to receive the signal at output 13. Thus, capacitor 25 is charged to the noise level when only noise appears at input 12 and it is isolated from the input when the signal appears. Thus, the voltage of capacitor 25 is the average of the noise signal alone and it is independent of signal voltage levels.

Amplifier 27 preferably has a high enough impedance with respect to the duration of signal on line 12 and the capacitance of capacitor 25 to keep capacitor 25 at substantially a constant voltage when switch 26 is open.

In the following sections the switch and the amplifier will be described in detail and the other components will be described generally.

*The switch.*—Switch 26 includes a transistor 40 that conducts bilaterally (as the double arrows represent) between the two switch terminals 41, 42 when its base terminal is given an appropriate current. Transistor 40 is nonconducting in either direction when its base terminal is given a voltage to reverse bias both junctions. As is well known in switches made up of bilateral transistors, the two base drive levels are chosen to establish these biasing conditions for the expected range of terminal voltages. The base drive is established by a differential amplifier made up of two transistors 44 and 45 having their emitter terminals connected to a terminal of a common resistor 46. The other terminal of resistor 46 is connected to a suitable potential point $-E_3$. (The polarity sign and the subscript indicate the relative values of the voltages.) Transistor 44 has its base terminal connected to a point of reference potential $-E_2$. A transistor 47 is connected in a common base configuration with a collector resistor 48 to control the base voltage of transistor 45 according to the voltage of terminal 13. The base terminal of transistor 47 is connected to a point of suitable reference potential $-E_1$. A resistor 49 and a diode 50 are connected as a clamp to a point $-E_2$ to prevent transistor 45 from having its base terminal more forwardly biased than transistor 44; this clamp establishes a constant total current in the two transistors 44, 45 independent of their relative conduction states.

Transistor 45 has its collector terminal connected to the base terminal of series switch transistor 40 so that when transistor 45 is on, it conducts base current for series transistor 40 and tends to turn it on. The collector terminal of transistor 44 is connected to the input terminal 41 of the switch. A circuit including two resistors 52 and 53 connects the base terminal of series transistor 40 to a point of potential $+E$ that is appropriate to close the switch when transistor 45 is off.

The control circuit for series transistor 40 draws a constant current from the circuit 16 connected to the switch input terminal 41. As has already been explained, the differential amplifier 44, 45 has a constant total current at the common connection of the emitter terminals. As the circuit has been described so far (without Zener diode 55, described later), both transistors are connected to conduct exclusively through the input connection to terminal 41 except that transistor 45 also conducts current through resistors 52, 53. Thus, except for the resistor connection, the control circuit for series transistor 40 would draw a constant current from input circuit 16. A Zener diode 55 is connected between input terminal 41 and the common connection of resistors 52, 53 and functions to make the total current conducted through terminal 41 constant and independent of the switch control signal.

The operation of Zener diode 55 can be understood better if a hypothetical operation without the diode is first considered. In this hypothetical operation the constant current at the emitter connection would appear at input terminal 41 when transistor 44 is on and the switch is off. When transistor 45 is on, a portion of this current would appear at input terminal 41 by conduction across the base-emitter junction of transistor 40 but another component would appear in the circuit of resistors 52, 53; this component would cause the current conducted by terminal 41 to change. Considered from another standpoint, changes in the base terminal voltage of transistor 40 would produce changes in the current required to operate the switch.

Zener diode 55 however causes the changing current that appears in resistor 53 to conduct through Zener diode 55 and into terminal 41 rather than through resistor 52. Thus Zener diode 55 operates to suppress current changes at terminal 41.

The preceding detailed description of switch 26 can be generalized. Resistor 46 and the associated potential point $-E_3$ form a current source; an improved current source can be formed by a well known transistor configuration in which a transistor has its collector terminal connected to the common connection of the emitter terminals of transistors 44 and 45, its emitter terminal connected to a terminal of resistor 46, and its base terminal connected to a suitable reference potential point. Thus the clamp of resistor 49 and diode 50 and resistor 46 or an equivalent current source form means for maintaining a constant total current at the collector terminals of transistors 44 and 45. Several multiple transistor arrangements that are functionally equivalent to the switching transistor 40 are well known and the base terminal of transistor 40 is more generally the control terminal for a selected transistor switching arrangement connected between the two switch terminals. The resistor 52 forms an incidental load on the circuit 16 connected to the switch input terminal 41. This effect is not ordinarily a problem but it can be reduced by replacing resistor 52 by a transistor current source similar to the circuit described as an atlernate to resistor 46. In a circuit in which a current source replaces resistor 52, any changes in current through the current source are prevented (from the definition of a current source.) In this modified circuit Zener diode 55 can be replaced with a resistor; the changing current conducted by resistor 53 will be conducted through the alternate resistor into terminal 41.

*The high impedance amplifier.*—The high impedance amplifier includes a transistor 60 and a resistor 61 that is connected from the emitter terminal of the transistor to a suitable potential point $-E_3$. A resistor 62 is connected in the collector circuit of transistor 60 and a transistor 60 and a transistor 63 of the opposite conductivity is connected to respond to voltage changes across resistor 62 to conduct into resistor 61 in phase with the emitter of transistor 60. The amplifier as it has been described so far is well known. The circuit further includes a third transistor 65 connected in the collector circuit of transistor 60 and having its base terminal connected to the collector terminal of transistor 62. Transistors 63 and 65 thus form a component group with high positive feedback, an arrangement that is commonly used as a bistable circuit.

The circuit also includes a resistor 67 in the collector circuit of transistor 63 that provides a selectable positive feedback signal to the base terminal of transistor 60 through a bias resistor 68; this arrangement provides a D.C. bias for transistor 60. A Zener diode 70 is connected across resistor 67 to establish a preselected voltage between the emitter terminal of transistor 60 and the collector terminal of transistor 63. A diode 71 is connected at the emitter terminal of transistor 61 in the collector circuit of transistor 63 to provide a temperature compensated voltage at the output terminal that offsets the voltage drop across the base-emitter junction of transistor 60.

In the emitter follower circuit that could be formed with transistor 60 and resistor 61 alone, the circuit of resistor 61 and the base-emitter junction of transistor 60 may produce a rather low impedance between the base terminal and ground. Transistors 60 and 63 (without transistor 65) cooperate to raise the input impedance, in such a circuit the input impedance may be limited by the base-to-collector resistance of transistor 60. The circuit of amplifier 27 operates to eliminate the loading effect of the base-collector resistance by varying the collector voltage of transistor 60 to oppose changes in the base-to-collector voltage.

The voltage at the collector terminal of transistor 60 is the same as the emitter voltage of transistor 65 and is thereby controlled by the voltage at the common connection of the collector terminal of transistor 63 and the base terminal of transistor 65. The circuit between the collector terminal of transistor 63 and the emitter terminal of transistor 60 is arranged to provide a voltage at the base terminal of transistor 65 that is appropriate to vary the collector terminal voltage of transistor 60 to follow the input voltage at the base terminal of transistor 60. Simultaneously, signal currents conducted in the collector circuit of transistor 60 are conducted without attenuation of gain through the emitter and collector circuit of transistor 65 to the base circuit of transistor 63, as hypothesized without the presence of transistor 65. Without transistor 65, the voltages at the base terminal and the collector terminal of transistor 60 would, of course, be out of phase by the normal inverter action. Thus the input resistance of amplifier 27 is a function of the product of the gain of transistor 60 and the parallel combination of the base-collector resistance of transistors 63 and 65. The input resistance is higher than conventional emitter-follower circuits by the factor of the current gain of transistor 60.

The features that gave amplifier 27 a high input resistance can be usefully adapted to circuits that use high input resistance devices such as vacuum tubes or field effect transistors. Although such devices have high resistance between their control terminals and other terminals, they have capacitance that adversely affects their circuits at high frequencies. Maintaining zero voltage between the emitter or reference terminal and the collector or output terminal of the input amplifying device reduces the base or input capacitance of such circuits.

*Other components.*—Amplitude detector 14 is conventional and is shown in block diagram form. The detector may comprise a diode arrangement for converting a polarity varying signal on line 12 to a polarity invariant signal at the detector output. For example, the detector may comprise a winding having a grounded mid-tap between two inductively coupled sections and two diodes connecting each end of the winding to an output terminal to provide a full wave rectified output of input signal 12.

Converter 15 is provided in the circuit of the drawing because the circuit is particularly intended for an application where the logarithm of the signal is the significant quality that should appear at output line 13. Such devices are well known and may comprise an amplifier with a low voltage Zener diode connected for feedback from the output to the input to give the amplifier a logarithmic characteristic.

Low pass filter 16 may comprise a passive network of resistances and reactances or it may comprise an integrating amplifier (an amplifier with a capacitor connected between its input and output terminals), a switch, capacitor and amplifier combination like 25, 26, 27 connected to the output of the amplifier to charge the capacitor periodically as the switch 26 is opened and closed. Such a circuit also includes another switch like switch 26 connected to discharge the integrating capacitor and connected by means of a delay circuit to respond to the sampling input signal. The delay circuit provides an appropriate separation of the action of the two switches. The amplifier at the output of the low pass filter is preferably given a low output impedance so that the small loading effect of switch 26 that has been described is reduced.

Difference amplifier 17 preferably comprises two transistors and a resistor in a well known configuration similar to transistors 44, 45 in switch 26. An offsetting bias is provided as a threshold for the circuit connecting input terminal 18 and the base terminal of the associated transistor. The threshold voltage circuit may comprise a potentiometer connected to a D.C. potential to form an adjustable voltage source and a resistor connecting the tap on the potentiometer to input terminal 18. This voltage establishes a threshold above which the signal plus noise amplitude at terminal 18 must rise before the differential amplifier receives this value. This threshold is adjusted to block low amplitude signals corresponding to the A.C. component of the noise amplitude and to transmit higher amplitude signals associated with a signal. This connection establishes a fixed or preselected threshold level and the signal on line 20 in effect adds to this threshold level a value that is automatically and adaptively adjusted according to the average noise amplitude as has been explained.

Differential amplifier 17 is arranged to be overdriven so that it produces a two condition output indicating the presence or absence of a signal.

*Other applications and embodiments.*—As the circuit has been described so far the output 13 of difference amplifier 17 is a binary value. The circuit just described can also be arranged to produce a useful analog signal output. For this application difference amplifier 17 is connected to receive the two signals 18, 20 without the threshold producing offset voltage and it is operated as a linear amplifier to produce the difference between signals 18, 20 at its output 13. Because logarithmic converter 15 produces at its output the logarithm of the signal amplitudes, subtracting the two logarithmic values in difference amplifier 17 is equivalent to taking the ratio of the signals on lines 18 and 20. Thus in this application difference amplifier 17 produces an output that indicates the signal to average noise ratio at input 12. To provide the control signal for switch 26 the overdriven amplifier with the threshold establishing voltage in its input circuit is connected to receive the output of the first amplifier.

From the detailed description of the preferred embodiment of the threshold detector, the switch, and the amplifier, those skilled in the art will recognize a variety of applications and suitable variations within the spirit of the invention and the scope of the claims.

What is claimed is:

1. A circuit comprising,
a detector for receiving a signal and producing an output that varies according to an electrical quantity of the signal and noise accompanying the signal,
averager means controllably connectable to receive said detector output and to produce an output corresponding to an average of the received detector output,
difference forming means connected to receive said detector output and said averager output and to produce an output that is a function of their difference, and
means connecting said averager to be responsive to said difference circuit output to produce an average output that is independent of the signal component in said detector output.

2. A circuit comprising,
a detector for receiving a signal and producing an output that varies in amplitude according to an electrical quantity of the signal and noise accompanying the signal,
averager means selectively connectable to receive said detector output and to produce an output corresponding to an average of the received amplitude of said detector output,
difference forming means connected to receive said detector output and said averager output and to produce an output that is a function of their difference, and
means connecting said averager to be responsive to said difference circuit output to receive said detector output in the absence of a signal and to be isolated from said detector output in the presence of a signal.

3. A circuit according to claim 2 in which the difference between said average output and said detector output is an A.C. component of noise amplitude varying about said average noise amplitude, and said difference forming means includes means establishing a fixed threshold corresponding to said A.C. component amplitude combined with said received averager output.

4. A circuit comprising, a detector for receiving a signal and producing an output that varies in amplitude according to an electrical quantity of the signal and noise accompanying the signal, averager means selectively connectable to receive said detector output and to produce an output corresponding to an average of the received value of said detector output, difference forming means connected to receive said detector output and said averager output and to produce a binary output, one state corresponding to a low amplitude detector output associated with noise alone, the other state corresponding to a high amplitude detector output associated with a signal and noise, and means connecting said averager to be responsive to said difference means output to receive said detector output in the absence of a signal and to be isolated from said detector output in the presence of a signal.

5. A circuit comprising, a detector for receiving a signal and producing an output that varies in amplitude according to an electrical quantity of the signal signifying the presence or absence of the signal and according to noise accompanying the signal, averager means selectively connectable to receive said detector output and to produce an output corresponding to an average of the received value of said detector output and to be isolated from said detector output and to hold its existing average value, difference forming means connected to receive said detector output and said averager output and to produce a binary output, one state corresponding to a detector output having an amplitude lower than said averager output and a fixed value representing a component of noise amplitude varying about said average noise amplitude, the other state corresponding to a detector output having an amplitude higher than said average and fixed values, whereby said difference means output signifies the presence or absence of a signal, and means connecting said averager to be responsive to said difference means output to receive said detector output in the absence of a signal and to be isolated from said detector output in the presence of a signal.

6. A circuit comprising, a detector for receiving a signal and producing an output that varies in amplitude according to an electrical quantity of the signal signifying the presence or absence of the signal and according to noise accompanying the signal, amplitude averager means, a switch operable in response to a signal at a control input to connect said averager means to receive said detector output, difference forming means connected to receive said detector output and said averager output and to produce a binary output, one state corresponding to a detector output having an amplitude lower than said averager output and a fixed value representing a component of noise amplitude varying about said average noise amplitude, the other state corresponding to a detector output having an amplitude higher than said average and fixed values, whereby said difference means output signifies the presence or absence of a signal, and means connecting said switch to respond to said difference means output to close in the absence of a signal and to open in the presence of a signal.

7. A circuit according to claim 6 in which said averager means includes a reactance connected to be charged when when said switch is closed and in which said circuit includes an amplifier coupling said difference means to receive said average, said amplifier having an input impedance appropriate to preserve the electrical state of said reactance when said switch is open.

8. A circuit according to claim 7 in which said reactance is a capacitance and said amplifier has a high input resistance.

9. A circuit according to claim 8 in which said amplifier comprises, a first load device, a first transistor having its base terminal connected to receive the input from said averager means and having its emitter terminal connected to said first load device, a second transistor having its emitter terminal connected to the collector terminal of said first transistor, second load means connected in the collector circuit of said second transistor, and means responsive to the voltage across said second load device to vary the voltage at the base terminal of said second transistor to maintain the voltage across the base and collector terminals of said first transistor substantially invariant.

10. A circuit according to claim 9 in which said switch comprises, semiconductor means arranged to conduct between two switch terminals in response to a current applied to a control trminal, an amplifier connected to produce a substantially constant total current at two outpuut terminals and to vary the relative conduction at said terminals in response to a signal at said switch control input, and means connecting one of said outputs to said control terminal of said semiconductor means and connecting the other of said outputs to one of said switch terminals whereby the switch draws a substantially constant current from said detector whether the switch is open or closed.

11. An amplifier having a high input impedance comprising, a first transistor and a first load device connected to the emitter terminal of said first transistor to produce a voltage at the emitter terminal that follows an input voltage applied to the base terminal, a second transistor of the same conductivity type having its emitter terminal connected to the collector terminal of said first transistor, a second load device connected in the collector circuit of said second transistor to produce a voltage at the collector terminal of said second transistor that varies out of phase with said input voltage, means responsive to said voltage at the collector terminal of said second transistor to produce a voltage at the base terminal of said second transistor that varies closely with said input voltage to increase the effective base to collector resistance of said first transistor.

12. A high impedance amplifier according to claim 11 in which said means for producing the voltage at the base terminal of said second transistor comprises, a third transistor of the opposite conductivity type with respect to said first and second transistors connected with a third load device in its collector circuit, a Zener diode connected to establish a predetermined voltage across said third load device, means connecting the base terminal of said third transistor to receive the voltage developed at the collector terminal of said second transistor, and means connecting the base terminal of said second transistor to receive the collector voltage of said third transistor.

13. A high impedance amplifier according to claim 12 in which said third transistor is connected to conduct in its collector circuit with said first load device.

14. A high impedance amplifier according to claim 13 in which said load devices are resistors.

15. A circuit according to claim 14 in which said third load device is a potentiometer and said circuit includes a resistor connecting the base terminal of said first transistor to a point on said potentiometer to provide bias current for said first transistor and said circuit further includes a diode connected between said first and third load devices, the common connection of said third load device and said diode forming an output terminal, said diode providing compensation for temperature produced variations in the base to emitter voltage of said first transistor.

16. A switch comprising, semiconductor means arranged to conduct between two switch terminals in response to a current applied to a control terminal, an amplifier connected to produce a substantially constant total current at two output terminals and to vary the relative conduction at said amplifier output terminals in response to a signal at an amplifier control terminal, and means connecting one of said amplifier output terminals to said control terminal and the other of said amplifier output terminals to one of said switch terminals whereby the switch draws a substantially invariant control current at said one switch terminal whether the switch is open or closed.

17. A switch comprising, semiconductor means arranged to conduct bilaterally between two switch terminals in response to a current applied to a control terminal and to be nonconductive in response to a predetermined potential applied to said control terminal, amplifier means connected to produce a substantially constant total current at two output terminals and to vary the relative conduction at said terminals in response to a signal at said switch control terminal, resistor means connecting said control terminal to a point of said predetermined potential for opening the switch, means connecting one of said amplifier output terminals to said control terminal to close said switch in response to a current at said one output terminal and connecting the other of said amplifier output terminals to one of said switch terminals to open said switch in response to a current at said other output terminal, and means cooperating with said resistor means to maintain substantially constant current at said point of predetermined potential whereby the control current at said one switch terminal is independent of the conduction state of the switch.

18. A switch according to claim 17 in which said resistor means comprises two resistors connected between said control terminal and said point of potential and having a common connection, and said means cooperating with said resistor means comprises a Zener diode connected between said one switch terminal and the common connection of said two resistors in a polarity to produce a substantialy constant voltage across its terminals.

19. A switch according to claim 18 in which said amplifier is a differential amplifier comprising two transistors having their collector terminals forming said amplifier output terminals, a reference potential point connected to the base terminal of one transistor, means connecting the base terminal of the other transistor to said amplifier control terminal, and a clamp connecting said base terminal of said other transistor to said reference potential point to maintain a substantially constant total current at said two collector terminals.

References Cited

UNITED STATES PATENTS

| | | | |
|---|---|---|---|
| 3,095,512 | 6/1963 | Little | 307—88.5 |
| 3,130,266 | 4/1964 | McLaughlin | 329—101 X |
| 3,191,124 | 6/1965 | Brown | 325—474 X |

ALFRED L. BRODY, *Primary Examiner.*